United States Patent [19]

Hensley, Jr. et al.

[11] 4,212,729

[45] Jul. 15, 1980

[54] PROCESS FOR DEMETALLATION AND DESULFURIZATION OF HEAVY HYDROCARBONS

[75] Inventors: Albert L. Hensley, Jr., Munster, Ind.; Leonard M. Quick, Naperville, Ill.

[73] Assignee: Standard Oil Company (Indiana), Chicago, Ill.

[21] Appl. No.: 928,141

[22] Filed: Jul. 26, 1978

[51] Int. Cl.² ............................................. C10G 23/02
[52] U.S. Cl. .............................. 208/210; 208/216 PP
[58] Field of Search ........................... 208/210, 216 PP

[56] References Cited

U.S. PATENT DOCUMENTS

| | | | |
|---|---|---|---|
| 3,714,032 | 1/1973 | Bertolacini et al. | 208/216 PP |
| 3,803,027 | 4/1974 | Christman et al. | 208/216 PP |
| 3,898,155 | 8/1975 | Wilson | 208/216 PP |
| 4,014,821 | 3/1977 | Hamner | 208/216 PP |
| 4,016,067 | 4/1977 | Fischer et al. | 208/210 |

Primary Examiner—George Crasanakis

Attorney, Agent, or Firm—James R. Henes; William T. McClain; William H. Magidson

[57] ABSTRACT

Disclosed is a two-stage catalytic process for hydrodemetallation and hydrodesulfurization of heavy hydrocarbon streams containing asphaltenes and a substantial amount of metals. The first stage of this process comprises contacting the feedstock in a first reaction zone with hydrogen and a demetallation catalyst comprising hydrogenation metal selected from Group VIB and/or Group VIII deposed on a large-pore, high surface area inorganic oxide support; the second stage of the process comprises contacting the effluent from the first reaction zone with a catalyst consisting essentially of hydrogenation metal selected from Group VIB deposed on a smaller pore, catalytically active support comprising alumina, said second stage catalyst having a surface area within the range of about 150 m²/gm to about 300 m²/gm, having a majority of its pore volume in pore diameters within the range of about 80 Å to about 130 Å, and the catalyst has a pore volume within the range of about 0.4 cc/gm to about 0.9 cc/gm.

37 Claims, 5 Drawing Figures

PROCESS FOR DEMETALLATION AND DESULFURIZATION OF HEAVY HYDROCARBONS

BACKGROUND

This invention relates to a catalytic process for hydrotreating heavy hydrocarbon streams containing asphaltenic material, metals and sulfur compounds. More particularly, this invention relates to hydroprocessing using multiple stage catalytic treatment with catalyst having improved effectiveness and activity maintenance in the desulfurization of metal-containing hydrocarbon streams.

As refiners increase the proportion of heavier, poorer quality crude oil in the feedstock to be processed, the need grows for processes to treat the fractions containing increasingly higher levels of metals, asphaltenes, and sulfur.

It is widely known that various organometallic compounds and asphaltenes are present in petroleum crude oils and other heavy petroleum hydrocarbon streams, such as petroleum hydrocarbon residua, hydrocarbon streams derived from tar sands, and hydrocarbon streams derived from coals. The most common metals found in such hydrocarbon streams are nickel, vanadium, and iron. Such metals are very harmful to various petroleum refining operations, such as hydrocracking, hydrodesulfurization, and catalytic cracking. The metals and asphaltenes cause interstitial plugging of the catalyst bed and reduced catalyst life. The various metal deposits on a catalyst tend to poison or deactivate the catalyst. Moreover, the asphaltenes tend to reduce the susceptibility of the hydrocarbons to desulfurization. If a catalyst, such as a desulfurization catalyst or a fluidized cracking catalyst, is exposed to a hydrocarbon fraction that contains metals and asphaltenes, the catalyst will become deactivated rapidly and will be subject to premature replacement.

Although processes for the hydrotreating of heavy hydrocarbon streams, including but not limited to heavy crudes, reduced crudes, and petroleum hydrocarbon residua, are known, the use of fixed-bed catalytic processes to convert such feedstocks without appreciable asphaltene precipitation and reactor plugging and with effective removal of metals and other contaminants, such as sulfur compounds and nitrogen compounds, are not common because the catalysts employed have not generally been capable of maintaining activity and performance.

While multiple-stage catalytic processes for first hydrodematallation followed by hydrodesulfurization treatment of heavy hydrocarbon streams having a high metals content are known, catalyst deactivation continues to be generally prohibitive to commercial application; particular difficulty has been experienced in the deactivation of the desulfurization catalyst primarily because conventional desulfurization catalysts containing Group VIII metal, particularly cobalt, have been relied upon, resulting in insufficient catalyst life, where metals in the hydrocarbon feedstock have caused desulfurization activity of the catalysts to deteriorate. Examples of multiple-stage catalytic processes for hydrotreatment of heavy hydrocarbon streams containing metals are disclosed in U.S. Pat. Nos. 3,180,820 (Gleim et al., 1965); 3,730,879 (Christman, 1973); 3,977,961 (Hamner, 1976); 3,985,684 (Arey, et al., 1977); 4,016,067 (Fischer, 1977); 4,054,508 (Milstein, 1977); 4,051,021 (Hamner, 1977) and 4,073,718 (Hamner, 1978).

The catalysts disclosed in these references contain hydrogenating component comprising one or more metals from Group VIB and/or Group VIII on high surface area support such as alumina, and such combinations of metals as cobalt and molybdenum, nickel and molybdenum, nickel and tungsten, and cobalt, nickel, and molybdenum have been found useful. Generally, cobalt and molybdenum have been preferred metals in the catalysts disclosed for hydrotreatment of heavy hydrocarbon streams, both in first-stage catalytic treatment to primarily remove the bulk of the metal contaminants, and in second-stage catalytic treatment primarily for desulfurization. None of the references disclose actual examples of processes employing catalyst containing only Group VIB metal in the second-stage catalyst, and none of the references has suggested that desulfurization activity can be maintained and the life of the desulfurization catalyst can be improved if the catalyst contains only Group VIB metal.

Hopkins et al. in co-pending U.S. Pat. application Ser. No. 811,835, filed June 30, 1977, which is incorporated herein by reference, disclose a process for hydrodemetallation of hydrocarbon streams containing asphaltenes and a substantial amount of metals, which comprises contacting the hydrocarbon stream with a catalyst consisting essentially of a small amount of a single hydrogenation metal from Group VIB or Group VIII, deposed on a large pore alumina; suitable examples of the hydrogenation metal are nickel or molybdenum. The catalyst is characterized by a surface area of at least 120 m$^2$/gm; a pore volume of at least 0.7 cc/g and an average pore diameter of at least 125 Å units.

Hopkins et al. suggest that while hydrodemetallation of heavy hydrocarbon streams is improved by employing catalyst consisting essentially of a single Group VIB or Group VIII hydrogenation metal, the substantially demetallated effluent will not normally be sufficiently desulfurized for further refining processes; consequently, there is great need for durable, effective desulfurization catalyst for use in processing the substantially demetallated stream.

The general object of this invention is to provide an improved process for hydrodemetallation and hydrodesulfurization of heavy hydrocarbon streams containing metals.

Another object of this invention is to improve the maintenance of activity of catalyst employed in the hydrodesulfurization stage of hydrodemetallation-hydrodesulfurization treatment of metal-containing heavy hydrocarbon streams.

We have found that the objectives of this invention can be attained by a sequential, two-stage hydrotreatment of metal-containing heavy hydrocarbon feedstock wherein a demetallation catalyst employed in the first stage provides demetallated effluent which is contacted in the second stage with the desulfurization catalyst containing at least one original Group VIB metal deposed on an alumina support. We have found for example that as little as 2.2 wt.% cobalt oxide causes rapid deactivation of the second stage catalyst for sulfur removal; as a result of omitting from the second-stage desulfurization catalyst the conventional Group VIII component, the deactivating effect of the Group VIII metal, particularly cobalt, is eliminated and the process of this invention will achieve significantly improved combination of hydrodemetallation and hydrodesulfurization of the metal-containing heavy hydrocarbon streams, with greatly extended life of the second-stage, hydrodesulfurization catalyst, even under severe conditions of operation. The combined effect of substantially demetallating the feed with effective catalyst in the first stage, together with the elimination of the deactivating influence of Group VIII metal in the second-stage catalyst accomplishes the particularly effective preservation of the desulfurization activity of the second-stage catalyst and the improved length of the on-stream service permitted by the process of this invention.

Briefly, this invention comprises a two-stage process for hydrodemetallation and hydrodesulfurization of a hydrocarbon feedstock containing asphaltenes and a substantial amount of metals. The first stage of this process comprises contacting the feedstock in a first reaction zone with hydrogen and a demetallation catalyst typically comprising hydrogenation metal selected from Group VIB and/or Group VIII deposed on a large-pore, high-surface area inorganic oxide support, suitably alumina, silica, magnesia, zirconia and similar materials; the first-stage catalyst has a surface area of about 120 m²/gm to about 400 m²/gm, an average pore diameter within the range of about 125 Å to about 350 Å, and a pore volume within the range of about 0.7 cc/gm to about 1.5 cc/gm. The second stage of this process comprises contacting the effluent from the first reaction zone with a catalyst consisting essentially of at least one active original hydrogenation metal selected from Group VIB deposited on a smaller-pore, catalytically active support comprising alumina, and said metal being in at least one form selected from the group consisting of the elemental form, the oxide, and the sulfide. The catalyst has a surface area within the range of about 150 m²/gm to about 300 m²/gm, an average pore diameter within the range of about 90 Å to about 160 Å, and the catalyst has a pore volume within the range of about 0.4 cc/gm to about 0.9 cc/gm.

The preferable pore volume distribution for the second stage catalyst is summarized as follows:

| Pore Diameters, Å | % of Pore Volume |
|---|---|
| 50–80 | <40 |
| 80–100 | 15–65 |
| 100–130 | 10–50 |
| 130+ | <15 |

Figure 5:
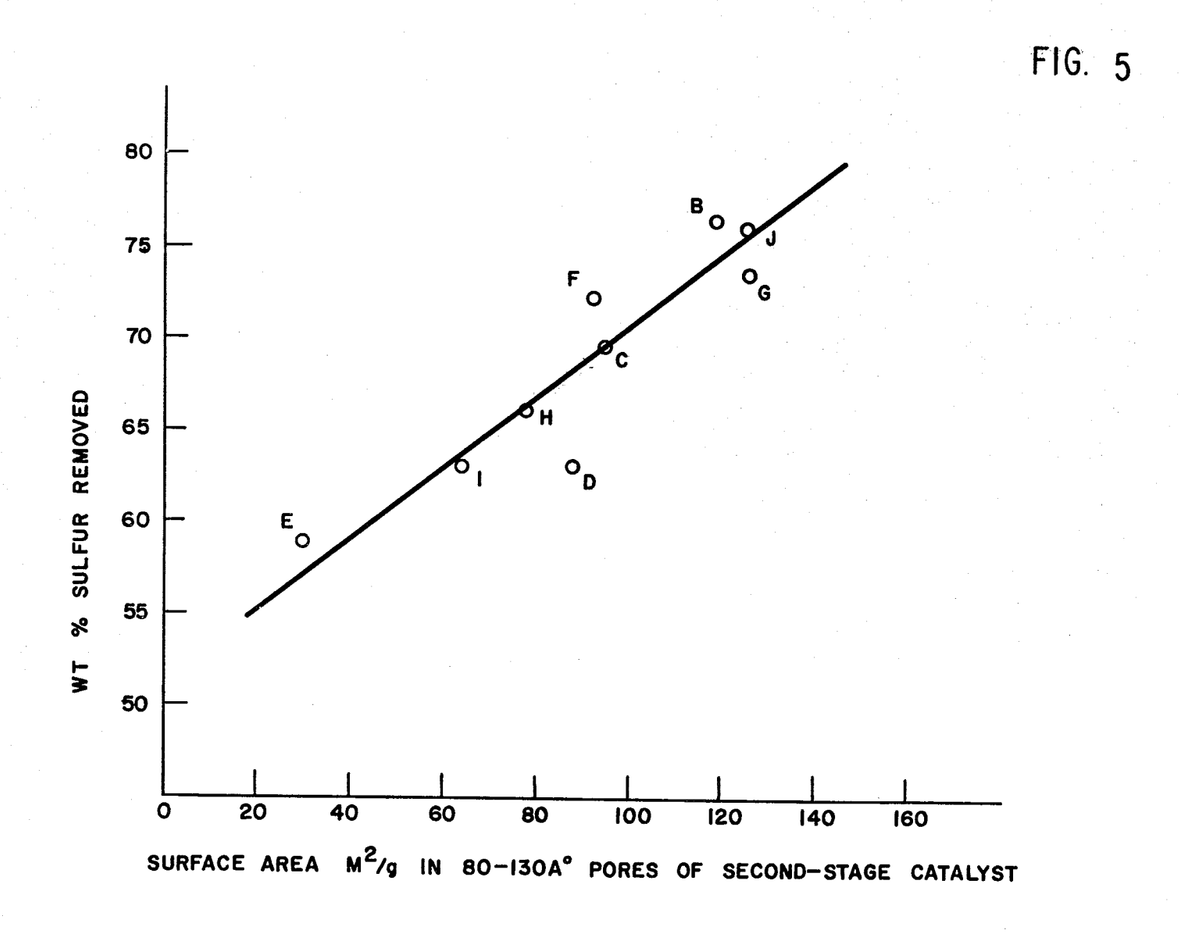
FIG. 5 depicts the relationship between desulfurization performance of two-stage processes, and the amount of surface area in 80–130 Å pores of the second-stage catalyst.

We have found that it is surprisingly important to the desulfurization performance of the second-stage catalyst of this invention that maximum surface area exist as shown in FIG. 5, in the catalyst pores having diameter in the range of about 80–130 Å; preferably the second-stage catalyst has about 90 to about 180 m²/gm surface area in 80–130 Å pores and more preferably such pores contain about 115–180 m²/gm.

The term "active original hydrogenation metal" is used herein to refer to only the hydrogenation metal that is incorporated into the catalyst during its preparation and does not include any metal that is deposited upon the catalyst during the use of the catalyst in any process. Molybdenum, which is generally superior to chromium and tungsten in demetallation and desulfurization activity, is a preferred Group VIB metal component in both the first-stage catalyst, and the second-stage catalyst. While generally Group VIB metal provides superior demetallation activity in comparison to Group VIII metal, nickel is a preferred Group VIII metal component in the first-stage catalyst.

The support for both first-stage catalyst and second-stage catalyst of this invention is preferably alumina; however, the support can comprise silica, phosphate, or other porous refractory inorganic oxide, preferably in amount less than about 5 wt.% of the support.

In both stages or reaction zones, catalysts may be employed in the form of a fixed-bed or an ebullated bed of particles. In the case of a fixed-bed, the particulate material catalyst should have a particle size of at least 1/32 inch effective diameter.

Broadly, the present invention is directed to a process for the hydrotreating of heavy hydrocarbon feedstocks. Such feedstocks will contain asphaltenes, metals, nitrogen compounds, and sulfur compounds. It is to be understood that the feedstocks that are to be treated by the process of the present invention will contain from a small amount of nickel and vanadium, e.g., about 40 ppm, up to more than 1,000 ppm of the combined total amount of nickel and vanadium and up to about 25 wt.% asphaltenes. This process is particularly useful in treating feedstock with a substantial amount of metals containing 150 ppm or more of nickel and vanadium and a sulfur content in the range of about 1 wt.% to about 10 wt.%. Typical feedstocks that can be treated satisfactorily by the process of the present invention will also contain a substantial amount of components that boil appreciably above 1,000° F. Examples of typical feedstocks are crude oils, topped crude oils, petroleum hydrocarbon residua, both atmospheric and vaccum residua, oils obtained from tar sands and residua derived from tar sand oil, and hydrocarbon streams derived from coal. Such hydrocarbon streams contain organometallic contaminants which create deleterious effects in various refining processes that employ catalysts in the conversion of the particular hydrocarbon stream being treated. The metallic contaminants that are found in such feedstocks include, but are not limited to, iron, vanadium, and nickel.

Nickel is present in the form of soluble organometallic compounds in most crude oils and residuum fractions. The presence of nickel porphyrin complexes and other nickel organometallic complexes causes severe difficulties in the refining and utilization of heavy hydrocarbon fractions, even if the concentration of such complexes is relatively small. It is known that a cracking catalyst deteriorates rapidly and its selectivity changes when in the presence of an appreciable quantity of the organometallic nickel compounds. An appreciable quantity of such organometallic nickel compounds in feedstocks that are being hydrotreated or hydrocracked harmfully affects such processes. The catalyst becomes deactivated and plugging or increasing of the pressure drop in a fixed-bed reactor results from the deposition of nickel compounds in the interstices between catalyst particles.

Iron-containing compounds and vanadium-containing compounds are present in practically all crude oils that are associated with the high Conradson carbon asphaltic and/or asphaltenic portion of the crude. Of course, such metals are concentrated in the residual bottoms, when a crude is topped to remove those fractions that boil below about 450° F. to 600° F. If such residuum is treated by additional processes, the presence of such metals adversely affects the catalyst in such processes. It should be pointed out the nickel-containing compounds deleteriously affect cracking catalysts to a greater extent than do iron-containing compounds. If an oil containing such metals is used as a fuel, the metals will cause poor fuel oil performance in industrial furnaces, since they corrode the metal surfaces of the furnaces.

While metallic contaminants, such as vanadium, nickel, and iron, are often present in various hydrocarbon streams, other metals are also present in a particular hydrocarbon stream. Such metals exist as the oxides or sulfides of the particular metal, or they are present as a soluble salt of the particular metal, or they are present as high molecular weight organometallic compounds, including metal naphthenates and metal porphyrins, and derivatives thereof.

Sequentially hydrotreating heavy hydrocarbon feedstock with the first-stage catalyst of this invention followed by the second-stage catalyst of this invention will allow hydrodemetallation and hydrodesulfurization with greatly extended catalyst life even under severe conditions.

The first-stage catalyst and the second-stage catalyst can be employed in a single reactor as a dual bed or the two catalysts can be employed in separate, sequential reactors, and various combinations of these two basic reactor schemes can be employed to achieve flexibility of operation and product upgrade. In commercial operation, either of the basic reactor schemes described can comprise multiple parallel beds of the catalyst. In any reactor scheme used in the process of this invention, the volumetric ratio of first-stage catalyst to second-stage catalyst can be within a broad range, preferably within about 5:1 to about 1:10 and more preferably within about 2:1 to about 1:5.

The first-stage, demetallation catalyst of the present invention comprises a hydrogenation component and a large-pore, high-surface area inorganic oxide support. Suitable demetallation catalysts comprise catalytic amounts of a hydrogenation component typically including a Group VIB metal, a Group VIII metal, or a mixture of Group VIB and Group VIII metals deposed on a porous inorganic oxide support such as alumina; suitably, the composition of the demetallation catalyst comprises from about 0.5 to about 30 wt.% of the Group VIB metal, calculated as the oxide, and/or from about 0.5 to about 12 wt.% of the Group VIII metal, calculated as the oxide, based upon the total weight of the composition. The Group VIB and Group VIII classifications of the Periodic Table of Elements can be found on page 628 of *WEBSTER's SEVENTH NEW COLLEGIATE DICTIONARY*, G. & C. Merriam Company, Springfield, Massachusetts, U.S.A. (1965). While calculated as the oxide, the hydrogenation metal components of the catalyst can be present as the element, as an oxide thereof, as a sulfide thereof, or mixtures thereof. When the first-stage catalyst is prepared to comprise both Group VIB and Group VIII metals, the Group VIII metal should be limited to less than about 3 wt.%, calculated as the oxide of the Group VIII metal based upon total weight of the prepared catalyst, in order to limit the catalyst deactivation influence of the Group VIII metal, particularly a cobalt component, when the catalyst is used to hydrotreat asphaltenic heavy hydrocarbons containing a substantial amount of metals. Preferably, the hydrogenation metal component of the first-stage catalyst comprises only a single active original hydrogenation metal selected from Group VIB or Group VIII; molybdenum, which is generally superior to chromium and tungsten in demetallation and desulfurization activity, is a preferred Group VIB metal component in both the first-stage catalyst, and the second-stage catalyst. While generally Group VIB metal provides superior demetallation activity in comparison to Group VIII metal, nickel is a preferred Group VIII metal component in the first-stage catalyst. Preferably, the Group VIB or Group VIII metal is present in an amount of about 0.5 wt.% to about 3 wt.% and most preferably about 1-2 wt.%, in order to minimize metal requirements while supplying sufficient demetallation activity in the first-stage catalyst.

The first-stage catalyst used in the process of the present invention can be prepared by the typical commercial method of impregnating a large-pore, high-surface area inorganic oxide support. Appropriate commercially available alumina, preferably calcined at about 800°–1,600° F. (426°–872° C.), for about 0.5 to about 10 hours, can be impregnated to provide a suitable lead catalyst having an average pore diameter of about 125 Å to about 350 Å, a surface area ranging from about 120 m²/gm to about 400 m²/gm, and a pore volume within the range of about 0.7 cc/gm to about 1.5 cc/gm. The alumina can be impregnated with a solution, usually aqueous, containing a heat-decomposable compound of the metal to be placed on the catalyst, drying, and calcining the impregnated material. The drying can be conducted in air at a temperature of about 150° F. (65° C.) to about 400° F. (204° C.) for a period of 1 to 16 hours. Typically, the calcination can be carried out at a temperature of about 800° F. (426° C.) to about 1,200° F. (648° C.) for a period of from 0.5 to 8 hours.

The catalyst that is used in the second stage of the process of the present invention is preferably prepared by first calcining pseudo-boehmite in static air at a temperature of about 800° F. (426° C.) to about 1,400° F. (759° C.) for a period of time within the range of about ½ hour to about 2 hours to produce a gamma-alumina. This gamma-alumina is subsequently impregnated typically with the aqueous solution or solutions containing the heat-decomposable salts of Group VIB metal. A preferred Group VIB metal is molybdenum which is generally superior to chromium and tungsten in desulfurization activity; combinations of the Group VIB metals can also be employed. The hydrogenation metal can be present in the catalyst in an amount within the range of about 5 wt.% to about 25 wt.% or greater, calculated as the oxide of the respective metal and based upon the total catalyst weight. Preferably, the metal is present in an amount of about 5 wt.% to about 15 wt.% and most preferably about 8–12 wt.% which has been found to produce optimum desulfurization activity with minimum metal requirement.

The finished second-stage catalyst that is employed in the process of the present invention has a pore volume within the range of about 0.4 cc/gm to about 0.9 cc/gm, a surface area within the range of about 150 m²/gm to about 300 m²/gm, and an average pore diameter within the range of about 90 Å to about 160 Å. Preferably, the catalyst possesses a pore volume within the range of about 0.5 cc/gm to about 0.7 cc/gm, a surface area within the range of about 150 m²/gm to about 250 m²/gm, and an average pore diameter within the range of about 110 Å to about 140 Å.

In order to maximize the desulfurization activity the second stage catalyst should have less than 40% of its pore volume in pores having diameters within the range of about 50 Å to about 80 Å, about 45% to about 90% of its pore volume in pores having diameters within the range of about 80 Å to about 130 Å, and less than about 15% of its pore volume in pores having diameters that are larger than 130 Å. More preferably, the second-stage catalyst has a pore volume distribution summarized as follows:

| Pore Diameters, Å | % of Pore Volume |
|---|---|
| 50–80 | <40 |
| 80–100 | 25–65 |
| 100–130 | 10–50 |
| 130+ | < 5 |

The catalyst pores having diameters 80–130 Å should contain from about 90–180 m²/gm and more preferably 120–180 m²/gm of surface area in order to attain maximum desulfurization activity.

In both the first reaction zone and the second reaction zone, operating conditions for the hydrotreatment of heavy hydrocarbon streams, such as petroleum hydrocarbon residua and the like, comprise a pressure within the range of about 1,000 psia (68 atmos) to about 3,000 psia (204 atmos), an average catalyst bed temperature within the range of about 700° F. (371° C.) to about 850° F. (454° C.), a LHSV within the range of about 0.1 volume of hydrocarbon per hour per volume of catalyst to about 5 volumes of hydrocabon per hour per volume of catalyst, and a hydrogen recycle rate or hydrogen addition rate within the range of about 2,000 SCFB (356 m³/m³) to about 15,000 SCFB (2671 m³/m³). Preferably, the operating conditions comprise a total pressure within the range of about 1,200 psia to about 2,000 psia (81–136 atmos); an average catalyst bed temperature within the range of about 730° F. (387° C.) to about 820° F. (437° C.); a LHSV within the range of about 0.3 to about 4; and a hydrogen recycle rate or hydrogen addition rate within the range of about 5,000 SCFB (890 m³/m³) to about 10,000 SCFB (1781 m³/m³).

If the process of the present invention were to be used to treat hydrocarbon distillates, the operating conditions would comprise a hydrogen partial pressure within the range of about 200 psia (13 atmos) to about 3,000 psia (204 atmos); an average catalyst bed temperature within the range of about 600° F. (315° C.) to about 800° F. (426° C.); a LHSV within the range of about 0.4 volume of hydrocarbon per hour per volume of catalyst to about 6 volumes of hydrocarbon per hour per volume of catalyst; and a hydrogen recycle rate or hydrogen addition rate within the range of about 1,000 SCFB (178 m³/m³) to about 10,000 SCFB (1381 m³/m³). Preferred operating conditions for the hydrotreating of hydrocarbon distillates comprise a hydrogen partial pressure within the range of about 200 psia (13 atmos) to about 1,200 psia (81 atmos); an average catalyst bed temperature within the range of about 600° F. (315° C.) to about 750° F. (398° C.); a LHSV within the range of about 0.5 volume of hydrocarbon per hour per volume of catalyst to about 4 volumes of hydrocarbon per hour per volume of catalyst; and a hydrogen recycle rate or hydrogen addition rate within the range of about 1,000 SCFB (178 m³/m³) to about 6,000 SCFB (1068 m³/m³).

Figure 1:
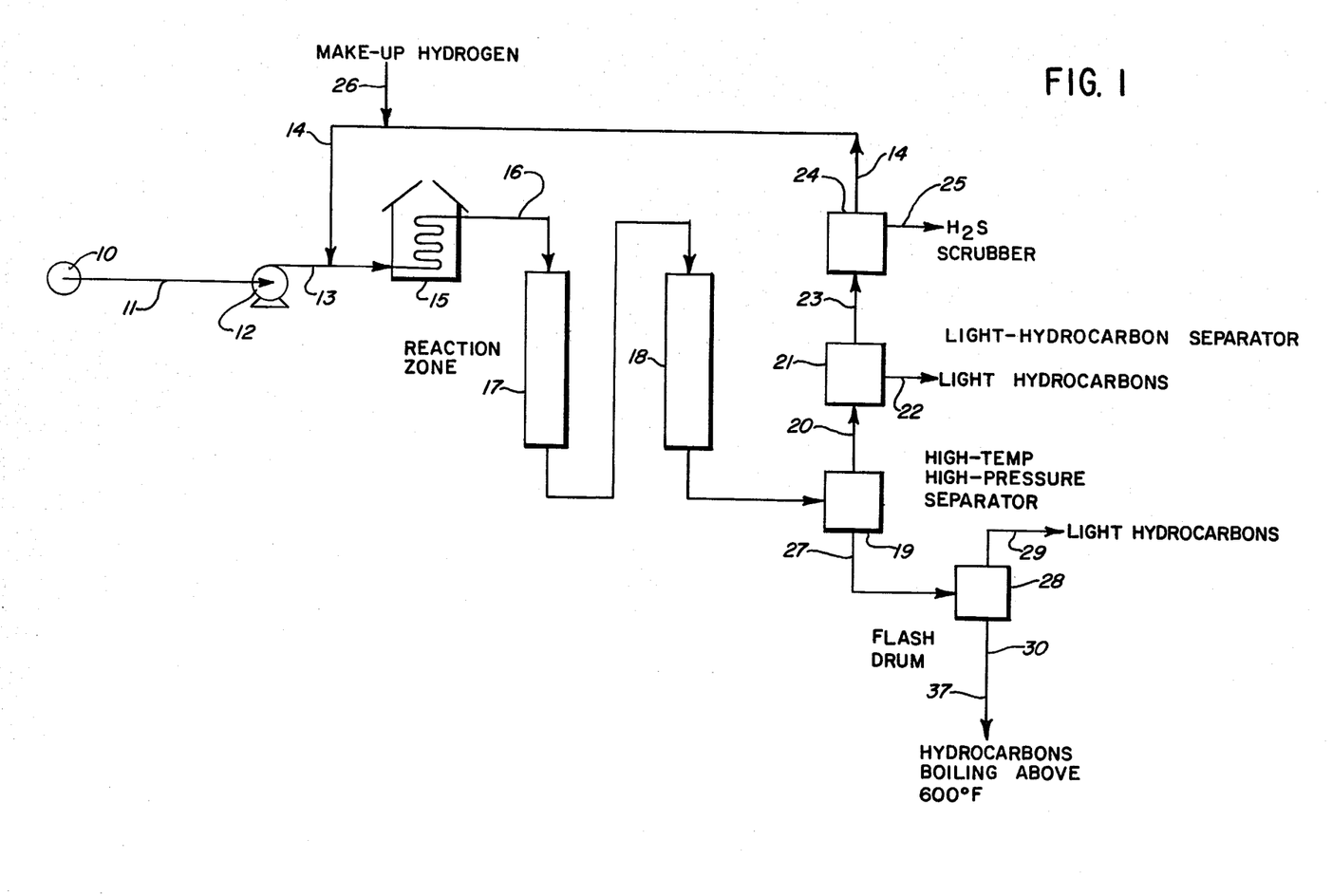
FIG. 1 is a simplified flow diagram of a preferred embodiment of the process of the present invention.

An embodiment of the process of the present invention is depicted in the accompanying FIG. 1, which is a simplified flow diagram and does not show various pieces of auxiliary equipment, such as pumps, compressors, heat exchangers, and valves. Since one having ordinary skill in the art would recognize easily the need for and location of such auxiliary equipment, its omission is appropriate and facilitates the simplification of the figure. This process scheme is presented for the purpose of illustration only and is not intended to limit the scope of the present invention.

Referring to FIG. 1, vaccum resid is withdrawn from source 10 through line 11 into pump 12, whereby it is pumped through line 13. A hydrogen-containing recycle gas stream, discussed hereinafter, is passed from line 14 into line 13 to be mixed with the hydrocarbon feed stream to form a mixed hydrogen-hydrocarbon stream. The mixed hydrogen-hydrocarbon stream is then passed from line 13 into furnace 15 where it is heated to a temperature within the range of about 740° F. (393° C.) to about 780° F. (415° C.). The heated stream is then passed through line 16 into first-stage reaction zone 17.

Reaction zones 17 and 18 comprise one or more reactors, each of which contains one or more fixed beds of catalyst.

The effluent from first-stage reaction zone 17 is passed into second-stage reaction zone 18; when desirable, effluent from reaction zone 17 can be repressurized by conventional means, not shown, prior to entering reaction zone 18.

The effluent from second-stage reaction zone 18 is passed into high-temperature, high-pressure, gas-liquid separator 19, which is operated at reactor pressure and a temperature within the range of about 760° F. to about 820° F. In separator 19, hydrogen-containing gas is separated from the rest of the effluent. The hydrogen-containing gas is passed from separator 19 through line 20. It is cooled and sent into light-hydrocarbon separator 21, wherein the condensed light hydrocarbons are separated from the hydrogen-containing gas and withdrawn via line 22. The hydrogen-containing gas is removed by way of line 23 and passed into scrubber 24, wherein the hydrogen sulfide is removed or scrubbed from the gas. The hydrogen sulfide is removed from the system by way of line 25. The scrubbed hydrogen-containing gas is then passed through line 14 where it can be joined by make-up hydrogen, if necessary, via line 26. The hydrogen-containing gas stream is then added to the hydrocarbon feed stream in line 13, as described hereinabove.

The liquid portion of the effluent is passed from the high-temperature, high-pressure, gas-liquid separator 19 by way of line 27 to high-temperature flash drum 28. In flash drum 28, the pressure is reduced to atmospheric pressure and the temperature of the material is within the range of about 700° F. (371° C.) to about 800° F. (426° C.). In flash drum 28, the light hydrocarbons containing not only the naphtha but those distillates boiling up to a temperature of about 550° F. (287° C.) to 600° F. (315° C.), such as fuel oils, is flashed from the rest of the product and is removed from the system by way of line 29. Such light hydrocarbons can be separated into their various components and sent to storage or to other processing units.

The heavier material that is separated from the light hydrocarbons, that is, material that boils at a temperature above about 600° F. (315° C.), is removed from flash drum 28 by way of line 30 for use as feeds to other processes or as a low-sulfur, heavy industrial fuel.

The material boiling above 600° F. (315° C.) that is removed from flash drum 28 through line 30 can be sent by way of line 37 to a resid catalytic cracking unit (not shown).

The following examples are presented to facilitate the understanding of the present invention and are presented for the purposes of illustration only and are not intended to limit the scope of the present invention.

EXAMPLE I

The process of the present invention was operated in an embodiment using Catalyst $A_1$ as the first-stage catalyst and Catalyst B as the second-stage catalyst. Catalyst $A_1$ contained approximately 2 wt.% $MoO_3$ on a large-pore alumina support, with the catalyst properties more fully specified in Table I. Catalyst B contained approximately 10 wt.% $MoO_3$ on a smaller-pore alumina support, with the catalyst properties more fully specified in Table II.

Prior to its use, each catalyst was calcined in still air at a temperature of about 1,000° F. (537° C.) for 1 hour and cooled in a desiccator. Feedstock for this example of the process was an Ardeshir petroleum crude vacuum resid fraction having properties presented in Table IV. The run was conducted downflow; the firststage Catalyst $A_1$ formed the top section of a fixed bed and the second-stage Catalyst B formed the bottom section of the fixed bed in approximately 1:1 volumetric ratio of the two catalysts.

The run was carried out in a bench-scale test unit having automatic controls for pressure, flow of reactants, and temperature. The reactor was made from ⅜-inch (0.95 cm) inside diameter stainless steel, heavy-walled tubing. A ⅛-inch (0.32 cm) outside diameter thermowell extended up through the center of the reactor. The reactor was heated by an electrically-heated steel block. The hydrocarbon feedstock was fed to the unit by means of a Ruska pump, a positive-displacement pump. The 14-to-20-mesh catalyst material was supported on 8-to-10-mesh alundum particles. Approximately 13–18 cubic centimeters of the dual bed of the catalysts in 1:1 volumetric ratio were employed. This amount of catalyst provided a catalyst bed length of about 10–13 inches. A 10-inch layer of 8-to-10-mesh alundum particles was placed over the catalyst bed in the reactor. The catalysts were placed in the annular space between the thermowell and the internal wall of the ⅜-inch (0.95 cm) inside-diameter reactor.

Selected samples from the run were obtained from the product receiver and were analyzed for pertinent information. Data obtained from samples taken during the ninth day of operation conducted at an LHSV of 0.7 volume of hydrocarbon per hour per volume of catalyst, a temperature of 780° F. (415° C.), and a pressure of 1,800 psig (122 atmos), are presented hereinbelow as Run 1 in Table VI and in FIG. 2.

EXAMPLE 2

For comparative purposes, a cobalt-molybdenum catalyst, designated Catalyst C, was used as the second-stage catalyst with first-stage Catalyst $A_1$, in the same bench scale equipment and conditions as described in Example 1. Catalyst C was prepared by reimpregnating Catalyst B with an aqueous solution of $Co(NO_3)_2 \cdot H_2O$ the recalcined finished Catalyst C had properties more fully specified in Table II. Prior to establishing hydrocarbon flow, the combination of Catalyst $A_1$ and Catalyst C was subjected to a conventional presulfiding treatment with a gas mixture containing 8 mole percent hydrogen sulfide in hydrogen at a pressure of 500 psig (34 atmos), with the temperature slowly raised from 300° F. (148° C.) to about 700° F. (371° C.). Results of the run on the Ardeshir vacuum resid feed are presented as Run 2 in Table VI and in FIG. 2.

EXAMPLES 3–9

Catalysts D, E, F, G, H, I and J, with properties fully specified in Tables II and III, were used as second-stage catalysts in embodiments of the process of this invention under conditions similar to those of Example 1, with either Catalyst $A_1$ or Catalyst $A_2$ in the first stage. Catalysts $A_1$ and $A_2$ were demonstrated to have nearly equivalent demetallation and desulfurization performance, as shown in Table V, in the hydrotreatment of a Jobo petroleum crude atmospheric resid fraction having properties presented in Table IV. Results from these examples are presented as Runs 3–9 on Tables VI and VII and in FIG. 2.

EXAMPLE 10

Again for comparison, a cobalt-molybdenum catalyst, designated Catalyst $D^1$, was used as the second-stage catalyst with first-stage Catalyst $A_1$, in the same bench-scale equipment and conditions as described in Example 1. Catalyst $D^1$ was prepared by reimpregnating Catalyst D with an aqueous solution of $Co(NO_3)_2 \cdot 6H_2O$; the recalcined finished Catalyst $D^1$ had properties more fully specified in TABLE II. Prior to establishing hydrocarbon flow, Catalysts $A_1$ and $D^1$ were presulfided as described in Example 2. Results of the run on the Ardeshir vacuum resid feed are presented in FIG. 3 which shows in comparison the superior desulfurization activity maintenance of Catalyst D having no cobalt component.

TABLE I

| FIRST STAGE CATALYST PROPERTIES | | | |
|---|---|---|---|
| CATALYST | $A_1$ | $A_2$ | $A_3$ |
| HYDROGENATION METAL: | | | |
| WT. % $MoO_3$ | 2.0 | 1.0 | 1.0 |
| PHYSICAL PROPERTIES | | | |
| SURFACE AREA $m^2/gm$ (BET) | 179 | 186 | 136 |
| PORE VOLUME cc/gm | 0.886 | 0.87 | 0.809 |
| AVERAGE PORE DIAMETER, Å | | | |
| 4V/A | 198.1 | 187 | 237 |
| % OF PORE VOLUME IN: | | | |
| 0–50 Å PORES | 1.5 | 2.7 | 0.2 |
| 50–80 Å PORES | 7.2 | 9.5 | 1.4 |
| 80–130 Å PORES | 31.8 | 33.7 | 9.5 |
| 130–200 Å PORES | 33.5 | 29.4 | 46.1 |
| 200 Å + PORES | 26.0 | 24.6 | 42.7 |

TABLE II

SECOND STAGE CATALYST PROPERTIES

| CATALYST | B | C | D | D[1] | E |
|---|---|---|---|---|---|
| HYDROGENATION METAL WT. % | | | | | |
| CoO | — | 2.2 | — | 2.56 | — |
| $MoO_3$ | 9.0 | 8.8 | 9.9 | 9.6 | 9.3 |
| PHYSICAL PROPERTIES | | | | | |
| SURFACE AREA $m^2/gm$ (BET) | 201 | 217 | 204 | 194 | 232 |
| PORE VOLUME cc/gm | .655 | .637 | .816 | .798 | .534 |
| AVERAGE PORE DIAMETER, Å | | | | | |
| 4V/A | 130 | 117 | 160 | 164 | 92 |
| % OF PORE VOLUME IN: | | | | | |
| 0–50 Å PORES | 1.7 | 6.9 | 2.9 | 2.7 | 25.0 |
| 50–80 Å PORES | 28.6 | 37.3 | 10.9 | 11.0 | 53.9 |
| 80–100 Å PORES | 40.8 | 38.4 | 14.2 | 13.2 | 16.4 |
| 100–130 Å PORES | 27.0 | 16.4 | 28.0 | 26.6 | 3.1 |
| 130–200 Å PORES | 1.1 | 0.6 | 41.9 | 42.1 | 0.6 |
| 200 Å + PORES | 0.7 | 0.8 | 2.0 | 4.4 | 1.0 |
| $m^2/gm$ SURFACE AREA IN: | | | | | |
| 0–50 Å PORES | 13.5 | 30.8 | 18.2 | 16.2 | 88.0 |
| 50–80 Å PORES | 66.8 | 87.2 | 35.9 | 34.8 | 114.0 |
| 80–130 Å PORES | 119.0 | 95.3 | 88.0 | 80.8 | 29.4 |
| 130–200 Å PORES | 1.3 | 0.6 | 60.3 | 49.8 | 0.4 |
| 200 Å + PORES | 0.4 | 0.4 | 1.8 | 59.0 | 0.3 |

TABLE III

SECOND-STAGE CATALYST PROPERTIES

| CATALYST | F | G | H | I | J |
|---|---|---|---|---|---|
| HYDROGENATION METAL WT. % | — | — | — | — | —;11 |
| CoO | | | | | |
| $MoO_3$ | 10 | 10 | 10 | 10 | 10 |
| PHYSICAL PROPERTIES | | | | | |
| SURFACE AREA $m^2/gm$ (BET) | 237 | 201 | 210 | 223 | 201 |
| PORE VOLUME cc/gm | 0.732 | 0.694 | 0.620 | 0.643 | 0.692 |
| AVERAGE PORE DIAMETER, Å | | | | | |
| 4V/A | 124 | 138 | 118 | 115 | 137 |
| % OF PORE VOLUME IN: | | | | | |
| 0–50 Å PORES | 12.8 | 2.3 | 7.2 | 9.6 | 2.4 |
| 50–80 Å PORES | 22.1 | 26.4 | 44.0 | 46.6 | 26.3 |
| 80–100 Å PORES | 17.5 | 45.1 | 33.8 | 26.5 | 44.7 |
| 100–130 Å PORES | 35.1 | 25.2 | 13.1 | 10.4 | 23.9 |
| 130–200 Å PORES | 11.8 | 0.6 | 0.8 | 2.9 | 1.8 |
| 200 Å + PORES | 0.7 | 0.4 | 1.0 | 4.0 | 0.9 |
| $m^2/gm$ SURFACE AREA IN: | | | | | |
| 0–50 Å PORES | 65.7 | 9.3 | 28.8 | 41.8 | 10.0 |
| 50–80 Å PORES | 63.2 | 64.9 | 102.2 | 113.0 | 65.0 |
| 80–130 Å PORES | 92.0 | 126.0 | 78.1 | 64.3 | 124 |
| 130–200 Å PORES | 15.8 | 0.7 | 0.8 | 3.1 | 2.0 |
| 200 Å + PORES | 0.4 | 0.2 | 0.4 | 1.6 | 0.5 |

All surface properties of the catalysts were determined by nitrogen desorption technique using a DIGISORB 2500 instrument manufactured by Micromeritics Instrument Corp.

TABLE IV

FEEDSTOCK PROPERTIES

| | Jobo 400° F. + Resid | Ardeshir Vacuum Resid |
|---|---|---|
| API Gravity | 9.4 | 5.0 |
| Carbon, Wt.% | 84.66 | 83.83 |
| Hydrogen, Wt.% | 10.38 | 10.15 |
| Sulfur, Wt.% | 3.70 | 5.0–5.18 |
| Nitrogen, Wt.% | 0.62 | 0.50 |
| API Gravity | 9.4 | 5.0 |
| Carbon Residue, Wt.% | 13.4 | 21.0 |
| Ni, ppm | 100 | 59 |
| V, ppm | 461 | 212 |
| 1000° F.–, Wt.% | 40.5 | 3.7 |
| Asphaltenes, Wt.% | 7.9 | 11.2 |

TABLE V demonstrates the nearly equivalent performance of catalysts $A_1$ and $A_2$, each run on the Jobo feedstock being operated without a second-stage catalyst.

TABLE V

| | $A_1$ | $A_2$ |
|---|---|---|
| FEED | Jobo | Jobo |
| TEMP | 780° F. | 780° F. |
| LHSV | 1.0 | 1.0 |
| PRESSURE | 1800 psig | 1800 |
| DAYS ON OIL | 6 | 9 |
| % SULFUR REMOVED | 42 | 43 |
| % Ni REMOVED | 54 | 59 |
| % V REMOVED | 75 | 76 |

TABLES VI and VII present results of runs on the Ardeshir feedstock using first-stage and second-stage catalysts as indicated.

TABLE VI

| Run No. | 1 | 2 | 3 | 3' | 4 |
|---|---|---|---|---|---|
| Catalysts | $A_1$+B | $A_1$+C | $A_1$+D | $A_1$+D[1] | $A_1$+E |
| Temperature, °F. | 780 | 780 | 780 | 780 | 780 |
| Pressure, psig | 1,800 | 1,800 | 1,800 | 1,800 | 1,800 |
| LSHV | 0.7 | 0.7 | 0.7 | 0.7 | 0.7 |
| Hydrogen rate, SCFB | 8,000 | 8,000 | 8,000 | 8,000 | 8,000 |
| % Sulfur removal | 76.6 | 69.5 | 63.2 | 54.0 | 58.0 |
| % Nickel removal | 66.1 | 65.0 | 62.7 | 55.6 | 53.9 |

TABLE VI-continued

| | | | | | |
|---|---|---|---|---|---|
| % Vanadium removal | 85.8 | 80.6 | 85.4 | 78.4 | 72.0 |
| Days on Oil | 9 | 9 | 9 | 9 | 7 |
| Product Gravity, °API | 16.3 | 15.3 | 15.3 | 14.9 | 14.7 |

TABLE VII

| Run No. | 5 | 6 | 7 | 8 | 9 |
|---|---|---|---|---|---|
| Catalysts | $A_2+F$ | $A_2+G$ | $A_2+H$ | $A_2+I$ | $A_2+J$ |
| Temp., °F. | 780 | 780 | 780 | 780 | 780 |
| Pressure, psig | 1,800 | 1,800 | 1,800 | 1,800 | 1,800 |
| LHSV | 0.7 | 0.7 | 0.7 | 0.7 | 0.7 |
| Hydrogen Rate, SCFB | 8,000 | 8,000 | 8,000 | 8,000 | 8,000 |
| Days on Oil | 9 | 6 | 5 | 6 | 6 |
| % Sulfur Removal | 72.0 | 72.0 | 66.8 | 63.0 | 75.9 |
| % Nickel Removal | 70.0 | 65.0 | 65.0 | 58.3 | 70.0 |
| % Vanadium Removal | 91.5 | 78.8 | 77.8 | 74.0 | 84.9 |
| Product Gravity, °API | 16.7 | 17.0 | 16.3 | 14.7 | 17.2 |

Catalysts $A_1$, $A_2$, and $A_3$ were commercially obtained from American Cyanamid Company and can be prepared using aqueous solution of ammonium molybdate to impregnate calcined, large-pore, high-surface area alumina supports, for example, KSA Light alumina commercially available from Kaiser Chemicals, a Division of Kaiser Aluminum and Chemicals Corporation. Catalyst $A_1$ was reimpregnated with aqueous solution of ammonium molybdate and recalcined, as indicated by its slightly higher $MoO_3$ content which did not alter its effective performance in comparison with Catalyst $A_2$.

Preferred second-stage catalyst, represented by Catalyst B, containing approximately 10 wt.% $MoO_3$, was prepared by aqueous ammonium molybdate impregnation of a smaller-pore gamma alumina support which was an Aero-100 alumina commercially obtained from American Cyanamid Company, having a surface area of about 222 $m^2/gm$, an average pore diameter of about 131 Å, and a pore volume of about 0.73 cc/gm, wherein the pore volume comprised the following exemplary distribution:

| Pore Diameters, A | % of Pore Volume |
|---|---|
| 0–50 | 2.5 |
| 50–80 | 24.9 |
| 80–130 | 66.5 |
| 130–200 | 2.8 |
| 200+ | 3.3 |

The impregnated material was dried under a heat lamp and calcined at 1,000° F. for a period of 2 hours.

Figure 2:
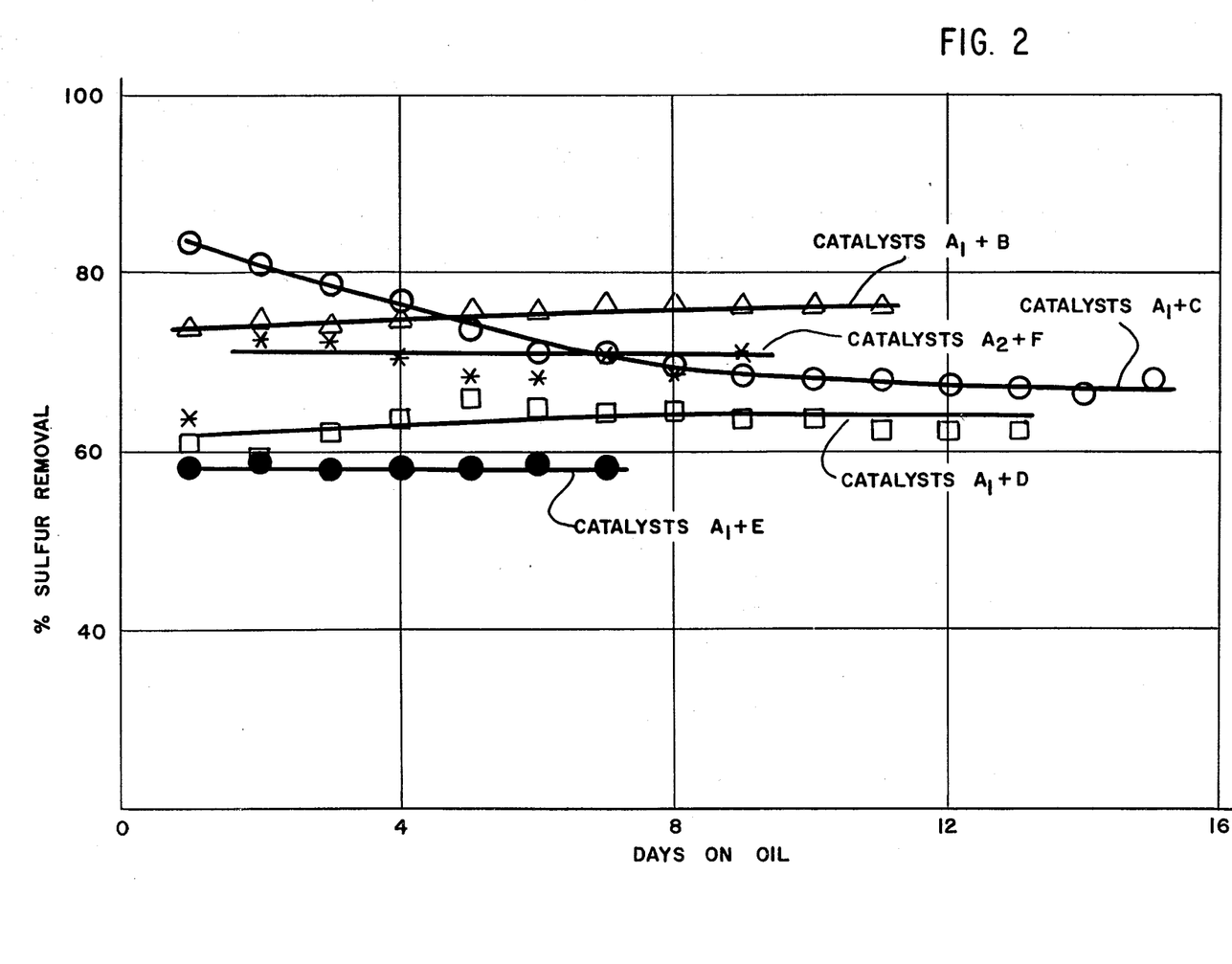
FIG. 2 depicts comparative desulfurization performance of various second-stage catalysts.

As Table VI and FIG. 2 demonstrate, Catalysts B and F, when used as the second-stage catalysts in the process of this invention, provide surprisingly superior desulfurization performance in comparison to second-stage Catalyst C. As little as 2.2 wt.% cobalt oxide content of second-stage Catalyst C is particularly detrimental to the desulfurization activity maintenance of the second-stage catalyst; Catalyst C shows rapid deactivation for sulfur removal in comparison to the excellent activity maintenance of Catalysts B and F, as well as Catalysts D, E, G, H, I and J.

In addition, Table VI and FIG. 2 show that second-stage Catalyst D containing a higher percentage of its pore volume in pores having a diameter in the range between 130 and 200 Å cannot match the desulfurization performance of second-stage Catalysts B and F. Catalyst E, containing insufficient pore volume in pores having a diameter in the range between 80–130 Å, is relatively poor in initial desulfurization performance.

Figure 3:
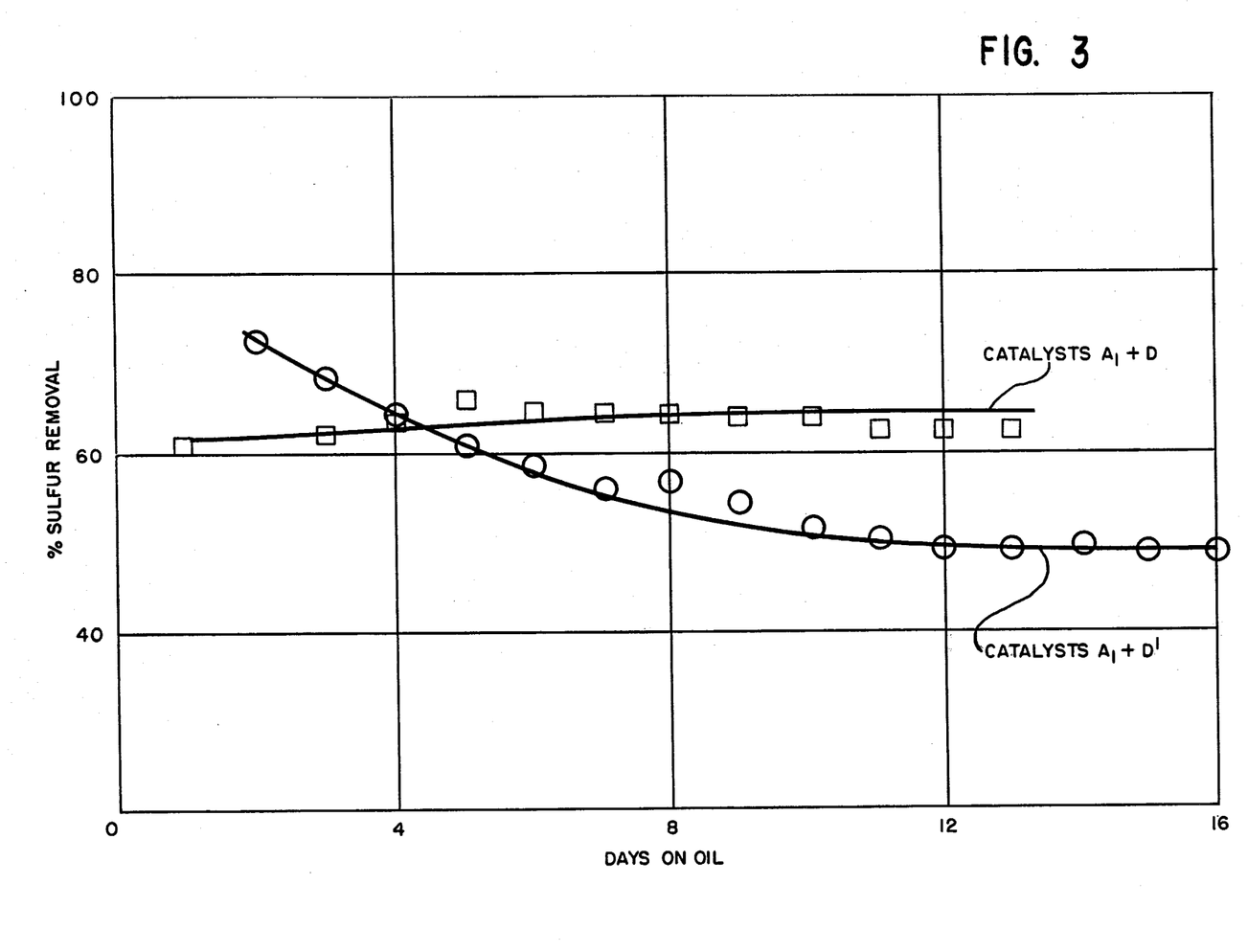
FIG. 3 emphasizes the deactivating effect of adding a cobalt component to the second-stage catalyst.

FIG. 3 shows the deactivating effect of adding a cobalt component to Catalyst D as described in Example 10.

FIG. 5 demonstrates our important finding that increase in the amount of surface area in the 80–130 Å diameter pores of the second-stage catalyst directly improves the level of desulfurization taken from Tables VI and VII, achieved in hydrotreating high metal feedstock. Clearly, desulfurization is particularly effective when employing second-stage catalyst having greater than 115 $m^2/gm$ surface area in 80–130 Å pores.

Overall, the first-stage catalyst and the second-stage catalyst employed in the process of this invention, represented by Catalyst $A_1$ and Catalyst B respectively, enable substantially improved desulfurization without impaired demetallation in the hydrotreatment of heavy hydrocarbon feedstocks containing a substantial amount of metals.

Figure 4:
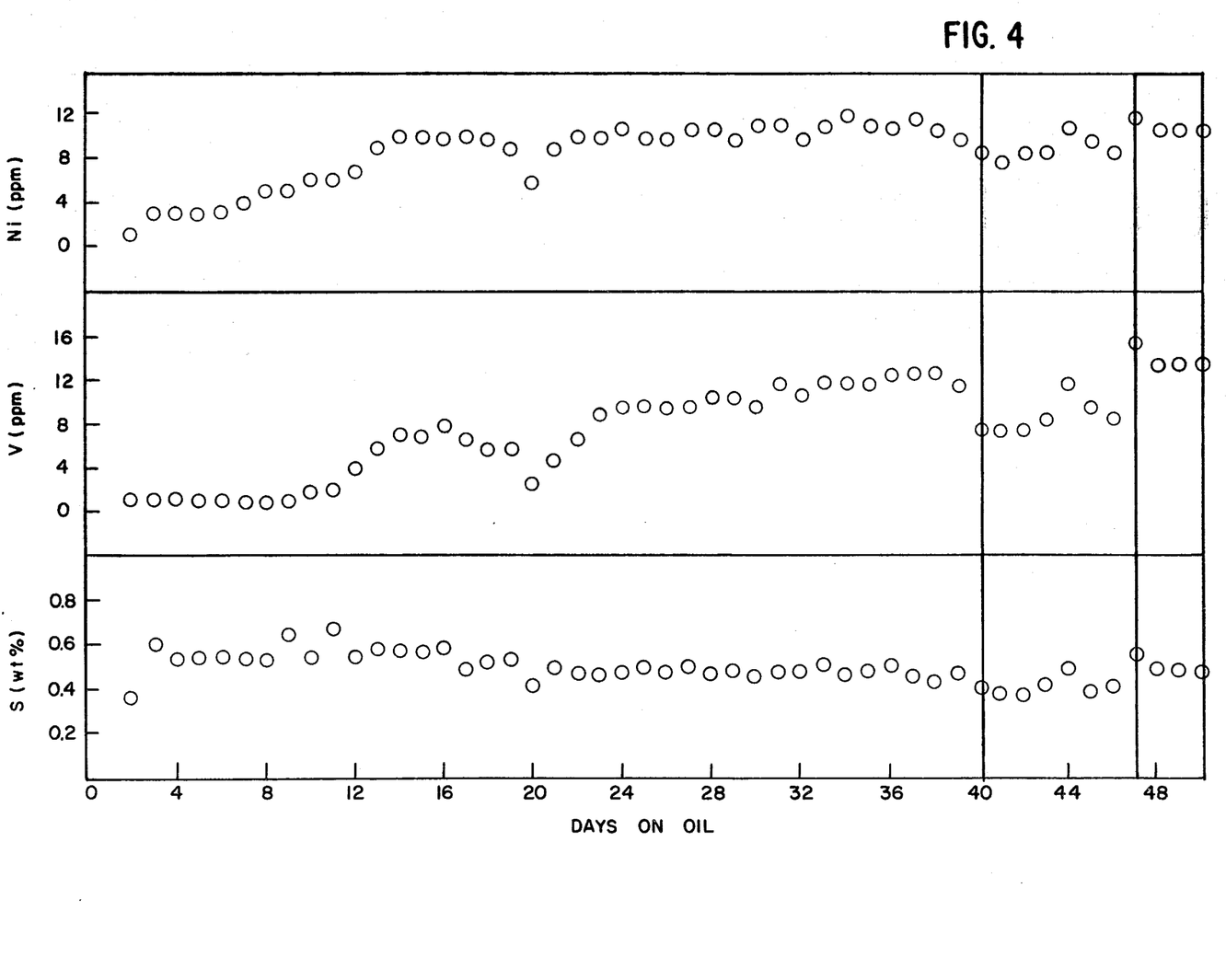
FIG. 4 depicts the particularly effective catalyst activity maintenance of a preferred embodiment of the two-stage process of this invention.

FIG. 4 shows the performance of a catalyst system having an extended amount of second-stage catalyst for further upgrading in the hydrotreated product using the feedstock of Table II. FIG. 4 demonstrates the particularly effective activity maintenance and performance of the two-stage process of this invention. This system consisted of Catalyst $A_1$ and Catalyst B in volumetric ratio of about 1:4 as a dual bed in the bench scale test unit described previously. The run shown in FIG. 4 was made at 780° F. (415° C.) and 1,800 psig (122 atmos.). The overall liquid hourly space velocity (LHSV) in this extended run was 0.30 based upon the combined volume of Catalyst $A_1$ and Catalyst B; accordingly the space velocity of Catalyst $A_1$, the first-stage catalyst, was 1.4 and the space velocity of Catalyst B, the second-stage catalyst, was 0.38. After 39 days, the overall LHSV was reduced to 0.25 for a period of 7 days, after which the space velocity was returned to 0.3 LHSV. From day 4 to day 39, the sulfur level was reduced to about 0.5%; between days 29 and 39, the lined-out system achieved about 90% desulfurization and about 92% demetallation with hydrogen consumption between about 1,000 to about 1,100 SCFB and $C_1-C_4$ gas make was about 2.2 wt.% on feed. As can be seen almost no desulfurization activity change occurred even though the operation was carried out at 780° F.

Lowering the overall space velocity to 0.25 increased desulfurization to over 91% and demetallation to about 93.4%. Upon return to 0.3 LHSV, performance returned to the same level achieved at the previous 0.3 space velocity. Table VIII presents comparison of the feed and lined-out product produced at 0.3 LHSV at 29 days on oil.

TABLE VIII

| Feed and Product Properties | | |
|---|---|---|
| | Feed Ardeshir Vacuum Resid | Hydrotreated Product |
| Sulfur, Wt% | 5.0 | 0.5 (90% Removal) |
| Carbon Residue, Wt% | 21.0 | 6.7 |
| Ni, ppm | 59 | 10 ⎫ |
| V, ppm | 212 | 11 ⎭ 92.3% Removal |
| 1000° F.−, Wt% | 3.7 | 58.5 |
| Asphaltenes, Wt% | 11.2 | 2.1 |

TABLE VIII-continued

| | Feed and Product Properties | |
|---|---|---|
| | Feed Ardeshir Vacuum Resid | Hydrotreated Product |
| Hydrogen Consumption | — | 1025 SCFB |
| 1000° F.+, Conversion % | | 56.8 |

Using the process of this invention, the ratio of the catalysts can be tailored to meet variations in feed properties and upgrading hydrotreated products desired. Generally, a product suitable as feed for a resid catalytic cracking operation will contain less than about 20 ppm total nickel and vanadium, less than about 0.6 wt.% sulfur and a carbon residue of less than about 8 wt.%.

We claim:

1. A process for the hydrodemetallation and hydrodesulfurization of a hydrocarbon feedstock containing asphaltenes and a substantial amount of metals, said feedstock comprising at least one member selected from the group consisting of crude oil, topped crude oil, petroleum hydrocarbon residua, oils obtained from tar sands, residua derived from tar sands oil, and hydrocarbon streams derived from coal, which process comprises:

(a) contacting said feedstock in a first reaction zone with hydrogen and a first-stage catalyst comprising hydrogenation metal component selected from the group consisting of a Group VIB metal, a Group VIII metal, and a mixture of said Group VIB and Group VIII metals, and a porous inorganic oxide support, said hydrogenation metal being in at least one form selected from the group consisting of the elemental form, the oxide, and the sulfide, and said catalyst having a surface area of about 120 m²/gm to about 400 m²/gm, a pore volume of about 0.7 cc/gm to about 1.5 cc/gm, and an average pore diameter of about 125 Å to about 350 Å; and (b) contacting the effluent from said first reaction zone in a second reaction zone with a second-stage catalyst consisting essentially of at least one active original hydrogenation metal selected from Group VIB deposed on a catalytically active support comprising alumina, said Group VIB metal being in at least one form selected from the group consisting of the elemental form, the oxide, and the sulfide, said catalyst having a surface area within the range of about 150 m²/gm to about 300 m²/gm, having a majority of its pore volume in pore diameters within the range of about 80 Å to about 130 Å, and a pore volume within the range of about 0.4 cc/gm to about 0.9 cc/gm.

2. The process of claim 1, wherein said second-stage catalyst possesses a pore volume within the range of about 0.5 cc/gm to about 0.7 cc/gm, a surface area within the range of about 150 m²/gm to about 250 m²/gm, and an average pore-diameter within the range of about 110 Å to about 140 Å.

3. The process of claim 2, wherein the pore volume of said second-stage catalyst comprises the following distribution:

| Pore Diameters, Å | % of Pore Volume |
|---|---|
| 50–80 | <40 |
| 80–100 | 15–65 |
| 100–130 | 10–50 |
| 130+ | <15 |

4. The process of claim 3, wherein the pores of said second-stage catalyst having diameters 80–130 Å contain about 90 to about 180 m²/gm of surface area.

5. The process of claim 2, wherein the pore volume of said second-stage catalyst comprises the following distribution:

| Pore Diameters, Å | % of Pore Volume |
|---|---|
| 50–80 | <40 |
| 80–100 | 25–65 |
| 100–130 | 10–50 |
| 130+ | <5 |

6. The process of claim 5, wherein the pores of said second-stage catalyst having diameters 80–130 Å contain about 115 to about 180 m²/gm of surface area.

7. The process of claim 1, wherein the Group VIB metal of said second-stage catalyst is molybdenum.

8. The process of claim 7, wherein the amount of molybdenum present in said second-stage catalyst is within the range of about 8 wt.% to about 12 wt.%, calculated as MoO₃ and based upon the total catalyst weight.

9. The process of claim 1, wherein the second-stage catalyst support consists essentially of alumina.

10. The process of claim 1, wherein the first-stage catalyst consists essentially of a single active original hydrogenation metal selected from Group VIB or Group VIII deposed on a support comprising alumina.

11. The process of claim 1, wherein the hydrogenation metal of said first-stage catalyst is a member of Group VIB.

12. The process of claim 11, wherein the Group VIB metal of said first-stage catalyst is molybdenum.

13. The process of claim 12, wherein the amount of molybdenum present in said first-stage catayst is within the range of about 0.5 wt.% to about 3 wt.%, calculated as MoO₃ and based upon the total catalyst weight.

14. The process of claim 1, wherein said first-stage catalyst comprises a Group VIB metal and less than about 3 weight percent of a Group VIII metal calculated as the oxide and based upon the total catalyst weight.

15. The process of claim 1, wherein conditions in the second reaction zone comprise an average catalyst bed temperature within the range of about 700° F. to about 850° F., a liquid hourly space velocity within the range of about 0.2 volume of hydrocarbon per hour per volume of catalyst to about 4 volumes of hydrocarbon per hour per volume of catalyst, and a pressure within the range of about 500 psia to about 5,000 psia.

16. The process of claim 15, wherein conditions in the second reaction zone comprise an average catalyst bed temperature within the range of about 740° F. to about 820° F., a liquid hourly space velocity within the range of about 0.3 volume of hydrocarbon per hour per volume of catalyst to about 2 volumes of hydrocarbon per hour per volume of catalyst, and a pressure within the range of about 1,000 psia to about 3,000 psia.

17. The process of claim 1, wherein the volumetric ratio of the first-stage catalyst to the second-stage catalyst is within the range of about 5:1 to about 1:10.

18. The process of claim 17, wherein the volumetric ratio is within the range of about 2:1 to about 1:5.

19. The process of claim 1, wherein the hydrocarbon feedstock comprises petroleum hydrocarbon residua.

20. The process of claim 1, wherein the hydrocarbon feedstock comprises oils obtained from tar sands.

21. A process for the hydrodemetallation and hydrodesulfurization of a hydrocarbon feedstock containing asphaltenes and a substantial amount of metals, said feedstock comprising at least one member selected from the group consisting of crude oil, topped crude oil, petroleum hydrocarbon residua, oils obtained from tar sands, residua derived from tar sands oil, and hydrocarbon streams derived from coal, which process comprises:

(a) contacting said feedstock in a first reaction zone with hydrogen and a first-stage catalyst consisting essentially of molybdenum as the single active original hydrogenation metal deposed on a large-pore, high-surface area support comprising alumina, said catalyst having a surface area of about 120 m²/gm to about 400 m²/gm, a pore diameter of about 125 Å to about 350 Å, said molybdenum being in at least one form selected from the group consisting of the elemental form, the oxide, and the sulfide; and (b) contacting the effluent from said first reaction zone in a second reaction zone with a second-stage catalyst consisting essentially of molybdenum as the single active original hydrogenation metal deposed on a catalytically active support comprising alumina and said molybdenum being in at least one form selected from the group consisting of the elemental form, the oxide, and the sulfide, said catalyst having a surface area within the range of about 150 m²/gm to about 300 m²/gm, having a majority of its pore volume in pore diameters within the range of about 80 Å to about 130 Å, and a pore volume within the range of about 0.4 cc/gm to about 0.9 cc/gm.

22. The process of claim 21, wherein said second-stage catalyst possesses a pore volume within the range of about 0.5 cc/gm to about 0.7 cc/gm, a surface area within the range of about 150 m²/gm to about 250 m²/gm, and an average pore diameter within the range of about 110 Å to about 140 Å.

23. The process of claim 22, wherein the pore volume of said second-stage catalyst comprises the following distribution:

| Pore Diameters, Å | % of Pore Volume |
|---|---|
| 50–80 | <40 |
| 80–100 | 15–65 |
| 100–130 | 10–50 |
| 130+ | <15 |

24. The process of claim 23, wherein the pores of said second-stage catalyst having diameters 80–130 Å contain about 90 to about 180 m²/gm of surface area.

25. The process of claim 22, wherein the pore volume of said second-stage catalyst comprises the following distribution:

| Pore Diameters, Å | % of Pore Volume |
|---|---|
| 50–80 | <40 |
| 80–100 | 25–65 |
| 100–130 | 10–50 |
| 130+ | <5 |

26. The process of claim 25, wherein the pores of said second-stage catalyst having diameters 80–130 Å contain about 115 to about 180 m²/gm of surface area.

27. The process of claim 21, wherein the amount of molybdenum present in said second-stage catalyst is within the range of about 8 wt.% to about 12 wt.%, calculated as $MoO_3$ and based upon the total catalyst weight.

28. The process of claim 21, wherein the second-stage catalyst support consists essentially of alumina.

29. The process of claim 21, wherein the amount of molybdenum present in said first-stage catalyst is within the range of about 0.5 wt.% to about 3 wt.%, calculated as $MoO_3$ and based upon the total catalyst weight.

30. The process of claim 21, wherein conditions in the second reaction zone comprise an average catalyst bed temperature within the range of about 700° F. to about 850° F., a liquid hourly space velocity within the range of about 0.2 volume of hydrocarbon per hour per volume of catalyst to about 4 volumes of hydrocarbon per hour per volume of catalyst, and a pressure within the range of about 500 psia to about 5,000 psia.

31. The process of claim 30, wherein conditions in the second reaction zone comprise an average catalyst bed temperature within the range of about 740° F. to about 820° F., a liquid hourly space velocity within the range of about 0.3 volume of hydrocarbon per hour per volume of catalyst to about 2 volumes of hydrocarbon per hour per volume of catalyst, and a pressure within the range of about 1,000 psia to about 3,000 psia.

32. The process of claim 21, wherein the volumetric ratio of the first-stage catalyst to the second stage catalyst is within the range of about 5:1 to about 1:10.

33. The process of claim 21, wherein the volumetric ratio is within the range of about 2:1 to about 1:5.

34. The process of claim 21, wherein the hydrocarbon feedstock comprises petroleum hydrocarbon residua.

35. The process of claim 21, wherein the hydrocarbon feedstock comprises oils obtained from tar sands.

36. The process of claim 3 wherein the particle size of said second-stage catalyst is at least about 1/32-inch (0.08 cm) or greater in effective diameter.

37. The process of claim 23 wherein the particle size of said second-stage catalyst is at least about 1/32-inch (0.08 cm) or greater in effective diameter.

* * * * *

UNITED STATES PATENT OFFICE
CERTIFICATE OF CORRECTION

Patent No. 4,212,729   Dated July 15, 1980

Inventor(s) Albert L. Hensley, Jr. and Leonard M. Quick

It is certified that error appears in the above-identified patent and that said Letters Patent are hereby corrected as shown below:

| Patent Column | Line | |
|---|---|---|
| 2 | 22 | "U.S. Pat application Ser." should be --United States patent application Serial--. |
| 2 | 33 | "0.7 cc/g" should be --0.7 cc/gm--. |
| 6 | 29-30 | "highsurface" should be --high surface--. |
| 9 | 46 | "5/8-inch" should be --3/8-inch--. |
| 9 | 62 | "5/8-inch" should be --3/8-inch--. |
| 10 | 46 | "TABLE should be --Table--. |
| 10 | 55 | "FIRST STAGE" should be --FIRST-STAGE--. |
| 11 | 2 | "SECOND STAGE" should be --SECOND-STAGE--. |
| 11 | 27 | " _ _ _ _ _;11" should be -- _ _ _ _ _ --. |
| 12 | 52 | "1800 psig  1800" should be --1800 psig   1800 psig-- |

UNITED STATES PATENT OFFICE
CERTIFICATE OF CORRECTION

Patent No. 4,212,729  Dated  July 15, 1980

Inventor(s)  Albert L. Hensley, Jr., and Leonard M. Quick

It is certified that error appears in the above-identified patent and that said Letters Patent are hereby corrected as shown below:

| Patent Column | Line | |
|---|---|---|
| 13 | 45 | "Pore Diameter, A" should be --Pore Diameter, $\overset{\circ}{A}$--. |
| 14 | 9 | "80-130 A" should be --80-130 $\overset{\circ}{A}$--. |
| 15 | 59 | "pore-diameter" should be --pore diameter--. |
| 18 | 46 | "second stage" should be --second-stage--. |

Signed and Sealed this

Twenty-fourth Day of February 1981

[SEAL]

Attest:

Attesting Officer

RENE D. TEGTMEYER

Acting Commissioner of Patents and Trademarks